350-333 AU 254 [redacted]
10/27/87 OR 4,702,560

United States Patent [19]

Endo et al.

[11] Patent Number: 4,702,560

[45] Date of Patent: Oct. 27, 1987

[54] LIQUID CRYSTAL DISPLAY DEVICE

[75] Inventors: Shyusuke Endo; Naofumi Aoyama; Toshihiko Yabuuchi, all of Mobara; Toshiyuki Sakuma, Ouhara; Kiyoshige Kinugawa, Mutsusawa, all of Japan

[73] Assignee: Hitachi, Ltd., Tokyo, Japan

[21] Appl. No.: 785,652

[22] Filed: Oct. 9, 1985

[30] Foreign Application Priority Data

Oct. 11, 1984 [JP] Japan ........ 59-211312

Nov. 2, 1984 [JP] Japan ........ 59-230101

[51] Int. Cl.[4] ........ G02F 1/133

[52] U.S. Cl. ........ 350/333; 340/784

[58] Field of Search ........ 350/333; 340/784

[56] References Cited

U.S. PATENT DOCUMENTS 4,206,459 6/1980 Houryu et al. ........ 350/333
4,317,115 2/1982 Kawakami et al. ........ 340/784
4,413,256 11/1983 Yasuda et al. ........ 350/333
4,427,978 1/1984 Williams ........ 350/333
4,560,982 12/1985 Sonehara et al. ........ 340/784
4,571,584 2/1986 Suzuki ........ 340/784
4,600,274 7/1986 Morozumi ........ 340/784
4,602,850 7/1986 DeBenedetti ........ 350/333

*Primary Examiner*—John K. Corbin
*Assistant Examiner*—Martin Lerner
*Attorney, Agent, or Firm*—Antonelli, Terry & Wands

[57] ABSTRACT

A liquid crystal display device comprising a liquid crystal module including liquid crystal display panel having a plurality of liquid crystal picture elements arranged in a matrix form, and driving circuits for applying driving signals to signal electrodes and to scanning electrodes of the liquid crystal display panel, respectively; a control circuit for controlling the operation of the liquid crystal module; a first circuit for dividing frequency of a timing signal given by the control circuit and producing a first signal of lower frequency; and a second circuit for inverting the first signal of lower frequency once per frame period and generating a second signal to reverse the polarity of voltages applied to liquid crystal display elements with its period $\tau_{M'}$ satisfying the inequality $$2.0 \leqq \tau_F(\text{the frame period})/\tau_{M'} \leqq 6.0.$$

16 Claims, 21 Drawing Figures

LIQUID CRYSTAL DISPLAY DEVICE

BACKGROUND OF THE INVENTION

The present invention relates to a liquid crystal display device and more particularly to a driving circuit in the liquid crystal display device.

In the case of time multiplex driving of liquid crystal display elements, the amplitude-selective addressing scheme is usually used as described in U.S. Pat. No. 3,976,362 to Kawakami and the polarity of voltages applied to liquid crystal layer is periodically reversed so that the liquid crystal layer has no mean DC level applied to it. For polarity reversal, there are two kinds of methods, one of which is to convert the driving waveforms into alternating waveforms by inverting the polarity within one frame period (the time necessary to scan all scanning lines once), and is hereafter referred to as driving method A, and the other is to convert the driving waveforms into alternating waveforms by inverting the polarity within the period of two frames and is hereafter referred to as driving method B. These methods of time multiplex driving for liquid crystal display elements are discussed in detail, for example, in the Nikkei Eleolronics, Aug. 18th, 1980, pp 150–174.

The time multiplex driving for liquid crystal display elements is described in the above mentioned patent and reference, and at present the driving method B is used mainly with the increase of scanning line numbers for time multiplexing in order to decrease the load of a driver LSI.

However, since the lowest driving frequency in the driving method B is the half of the frame frequency, e.g. 70 Hz, there may be the case that liquid crystal display elements are driven in very low frequency according to a pattern to be displayed. On the other hand, the threshold voltage of the liquid crystal has a characteristic dependent on frequency of applied voltage has in the case that the threshold voltage of the liquid cyrstal, a voltage at which ON-state of liquid crystal display elements begins to be visible, falls largely in lower frequencies, storing blurs occur in display according to particular display patterns when the driving method B is used. For example, if the liquid crystal has a characteristic in which the threshold voltage $V_{th}$ drops in lower frequencies as is shown in FIG. 1, and the alphabet E is displayed by applying voltage between signal electrodes $C_1, C_2, \ldots, C_{20}$ and scanning electrodes $R_1, R_2, \ldots, R_{27}$ selectively as in FIG. 2, the contrast of the shaded areas of $A_1$, $A_2$ and $A_3$ is lower than that of the selected element D on $B_1$ and $B_2$ areas but higher than the non-selected areas E on $B_1$ and $B_2$. As a result, dark shades appear near an intended display as shadows. This phenomenon can be explained as follow. The frequency components of the driving voltage $V_a$ applied to the liquid crystal display elements on the areas of $A_1$, $A_2$ and $A_3$ are extremely lower than those of the driving voltage $V_a$ applied to the liquid crystal display elements on the areas of B and $B_2$. Considering the frequency dependence of the threshold voltage shown in FIG. 1, the voltage $V_1$ applied to the elements on $A_1$, $A_2$ and $A_3$ areas with respect to their threshold voltages at their frequency are higher than the voltage $V_2$ applied to the elements on $B_1$ and $B_2$ areas with respect to their threshold voltages at their frequency and as a result, contrast of the elements on $A_1$, $A_2$ and $A_3$ areas is higher than that of the non-selected elements on $B_1$ and $B_2$ areas and the phenomenon of blurs occurs around the display. As an example, the driving waveforms are shown in FIGS. 3(*a*) to (*j*) which are applied to the display elements $a_1$, $a_2$, $a_3$ and $a_4$ shown in FIG. 2 by the driving method B. In these figures, by comparing the driving waveforms applied to the display elements $a_2$ with the driving waveforms applied to the remaining display elements $a_1$, $a_3$ and $a_4$, it can be understood that the frequency components of the driving waveforms applied to the display element $a_2$ is extremely higher than the frequency components of the driving waveforms applied to the display elements $a_1$, $a_3$ and $a_4$, and, from the relations shown in FIG. 1, it can be understood easily that the blurs in display become excessively conspicuous with the increase of frequency range of the driving waveforms. Further, in FIG. 2 the $B_1$ area appears blanched compared with $B_2$ areas due to the higher frequency components for the $B_1$ area, and this phenomenon can be explained in the same way as above. Further, in FIG. 3 a symbol $\tau_d$ designates a pulse width of a scanning signal.

As a solution for this problem, it may be considered to use the driving method A, but it is known that different type of blurs in display appear by this driving method A.

With increase of a number of picture elements to be displayed, the display screen dividing method is employed. In this case, for example, the display panel is divided into two portions in vertical as shown in FIG. 4. The liquid crystal display panel 3 consisting of 2*n* scanning lines is divided into two blocks of the first block 3*a* consisting of the scanning lines $X_1 \sim X_n$ and the second block 3*b* consisting of the scanning lines $X_{n+1} \sim X_{2n}$ and each scanning line is driven with 1/n duty.

FIG. 5 is a block diagram showing one exmaple of the liquid crystal display device comprising a liquid crystal module and a control circuit for controlling this liquid crystal module.

In this figure, reference numeral 1 denotes a liquid crystal module comprising a liquid crystal display panel having a plurality of liquid crystal picture elements arranged in a matrix and driving circuits for the liquid crystal and 2 denotes a control circuit (for example, Liquid Crystal Display Controller Board CB 1026R available from Hitachi, Ltd.) for controlling the performance of the liquid crystal module 1. Numeral 3 denotes the liquid crystal display panel shown in FIG. 2, 4*a* and 4*b* signal electrode driving circuits for giving signal voltages as its outputs to the Y axis signal lines $Y_1, Y_2, Y_3, \ldots, Y_m$ of the liquid crystal display panel blocks 3*a* and 3*b*, respectively, 5 a scanning electrode driving circuit for giving selective pulses as its outputs for scanning the X axis scanning lines $X_1, X_2, X_3, \ldots, X_n$ and $X_n, X_{n+1}, X_{n+2}, \ldots, X_{2n}$ of the liquid crystal display panel blocks 3*a* and 3*b* respectively and sequentially and 6*a* power supply for supplying proper voltages to drive the signal electrode driving circuits 4*a*, 4*b* and the scanning electrode driving circuit 5 by the amplitude-selective addressing scheme as described in U.S. Pat. No. 3,976,362 to Kawakami. Numeral 7 denotes a timing circuit for generating the latch signal $CL_1$, data shift signal $CL_2$ and control signal M for AC driving as the timing signals to operate the liquid crystal module 1, and 8 a power supply for supplying the proper voltage to the power supply 6. Symbols $D_1$ and $D_2$ denote data terminals to which ON-OFF informations for all picture elements on the signal electrodes $Y_1, Y_2, Y_3, \ldots, Y_m$ are given serial'y as the inputs and FLM an input terminal to which the frame frequency signal is given as its input. Further explanation is described in "Liquid-Crystal Matrix Display". Advances in Image Pickup and Display, Academic Press.

Also FIGS. 6(*a*) to (*d*) show timing charts of the output signals of the control circuit 2 shown in FIG. 5 by the driving method B.

In this configuration ON-OFF information signals for all picture elements on a certain scanning line are given to the data terminals $D_1$ and $D_2$ serially as inputs. The shift register in the signal electrode driving circuits 4*a* and 4*b* shift the data according to the data shift signal $CL_2$. An latch signal $CL_1$ is output when the shift register is filled by the serial data and is latched by a latch circuit. By switching an analog multiplexer according to the latched data and taking out the pulse signals for either selecting or non-selecting elements, desired picture elements can be displayed. In this case, the latch signal $CL_1$ generates signals at every time interval which equals to the divided value of the frame period $\tau_F$ by N, which is the number of time multiplexed scanning lines and latches the data. Also, in the driving method B, as has been mentioned above, the driving waveforms for the liquid crystal are converted into alternating waveforms by inverting the polarity within two frames and the complete alternating waveforms within two frames can be obtained by the control signal M having the period of twice the frame period $\tau_F$. By using such a driving method, when all elements are displayed (ON) or all elements are not displayed (OFF), the frequency of the driving waveforms applied to the liquid crystal equal to about the half of the frame frequency $f_F = 1/\tau_F$. Like this, in the driving method B the lowest frequency component is low and this causes the blurs in display.

FIG. 7(*a*) is a block diagram of the transfer gate used to drive each of the rows and columns of a matrix liquid-crystal display. This gate consists of a PMOS transistor, and NMOS transistor, and an inverter that produces negative output voltage when it receives positive input voltage. The gate provides a bidirectional conductive path between an input terminal I and an output terminal O according to a control signal that is applied to a control terminal C. FIG. 7(*b*) shows the abbreviated symbol for the gate.

FIG. 8 shows a typical configuration of a basic matrix panel drive circuit using the transfer gates. The liquid-crystal panel itself is at the top right. Voltages $(1/b)V_0$, $(2/b)V_0$, $(1-2/b)V_0$, and $(1-1/b)V_0$ are produced by applying the source voltage $V_0$ to the series resistors in the bottom left corner of the circuit. Here, the optimum value of b is set at $b = \sqrt{N}+1$ (N being equal to n in FIG. 5). These voltages are switched by the transfer gates to produce the scanning voltages for the scanning electrodes, and the selected and the nonselected signal voltages for the signal electrodes.

The scanning transfer gates for the scanning electrodes are turned "on" and "off" by signals from the scanner (a ring counter) at the top left. These gates generate 1 selected voltage and (N−1) nonselected voltages, and send these voltages to the scanning electrodes on the liquid-crystal panel.

The transfer gates of the signal circuit (signal electrode circuit) are switched "on" or "off" according to the data stored in the data latch at the bottom right. The contents of the latch are determined by signals from a driver control circuit. Each of two select switches generates a pair of positive and negative control voltages for the transfer gates when these switches receive signals from the scanner or the data latch.

FIG. 6 shows a timing chart of the interface signals necessary to drive a matrix liquid-crystal panel which has n scanning electrodes.

By causing the high level of the scanning signals to correspond to selected conditions and the low level of the scanning signals to correspond to nonselected conditions, the scanning electrode driver supplies scanning voltages that are applied to the liquid-crystal panel. Driving waveforms can be changed in accordance with high or low positions of the clock signal M, so that alternative voltages can be applied to the panel. The waveforms that are changed into $(V_0)/(0)$ under selected conditions and into $(1/b)V_0/\{(1-1/b)V_0\}$ under nonselected conditions serve as scanning voltages.

As in the case of the scanning voltage, signal waveforms corresponding to selected and nonselected conditions are applied to the vertical electrodes of the display in accordance with the input data. They are $(0)/(V_0)$ under selected conditions and $(2/b)V_0/\ \{(1-2/b)V_0\}$ under nonselected conditions in accordance with the control signal M.

In case a black pattern is displayed on the entire part of liquid-crystal display panel 3 on the basis of the 1/n duty and driving method B by utilizing a liquid crystal display panel shown in FIG. 4, namely the liquid crystal display panel 3 where the total number of scanning lines is 2n and the display panel is divided into two blocks of the first block 3*a* consisting of the scanning lines $X_l \sim X_n$ and the second block 3*b* consisting of the scanning lines $X_{n+1} \sim X_{2n}$ and a power supply circuit 6 for driving liquid crystal with low output impedance, it has been observed that the display on the first scanning line $X_l$ of the first block 3*a* and the first scanning line $X_{n+1}$ of the second block 3*b* is dimmer than that of other scanning lines as shown in FIG. 10. The mechanism of generating such phenomenon can be considered as explained below because the point of starting polarity inversion of drive waveform to be applied to the liquid crystal layer in the driving method B, namely the point of changing the control signal M corresponds respectively to the first scanning line $X_l$ of said first block 3*a* and the first scanning line $X_{n+1}$ of said second block 3*b*.

Namely, since polarity of voltage being applied to the liquid crystal layer is inverted in such a timing that the control signal M is changed over, a heavy transient current flows into a resistor $R_4$ (LSI latch-up prevention resistor) in FIG. 9. Accordingly, a voltage waveform being applied to the scanning lines $X_l$ and $X_{n+1}$ is distorted by the resistor-capacity network of the resistor $R_4$ and a capacity C of liquid crystal layer and thereby a voltage effective value of these scanning lines is different from that of the other scanning lines, thus resulting in blur in display.

Here, the resistors $R_1$, $R_4$ shown in FIG. 9 are resistors for preventing latch-up of LSI and $R_3$ (b-4)R is a resistor required for supplying a predetermined voltage by resistance division on the occasion of driving the liquid crystal by the amplitude-selective addressing scheme. Moreover, a transistor used at the $V_0$ input terminal of power supply circuit is used for eliminating influence of user-side power supply circuit.

Reduction of a value of resistor $R_4$ can be considered as a measures for eliminating a problem of blur in display mentioned above but it is not desirable for prevention of latch-up of LSI and it is also impossible to set the capacity C of liquid crystal to zero and thereby blue in display has not been suppressed to zero.

SUMMARY OF THE INVENTION

An object of the present invention is to provide a liquid crystal display device free from the blurs in display due to the lowering of the threshold voltage of the liquid crystal in low frequency.

Another object of the present invention is to provide a liquid crystal display device free from spurious signals in display due to reversal of the polarity of voltages applied to liquid crystal display elements.

The above mentioned objects can be accomplished by the present invention which provides a liquid crystal display device comprising:

a liquid crystal module including a liquid crystal display panel having a plurality of liquid crystal picture elements arranged in a matrix form, and driving circuits for applying driving signals to signal electrodes and to scanning electrodes of the liquid crystal display panel, respectively;

a control circuit for controlling the operation of the liquid crystal module;

first means for dividing frequency of timing signal given by the control circuit and producing a first signal of lower frequency; and second means for inverting the first signal of lower frequency once per frame period and generating a second signal to reverse the polarity of voltages applied to liquid crystal display elements with its period $\tau M''$ satisfying the inequality $$2.0 \leqq \tau_F(\text{the frame period})/\tau_{M''} \leqq 6.0$$

DETAILED DESCRIPTION OF PREFERRED EMBODIMENTS

Figure 1:
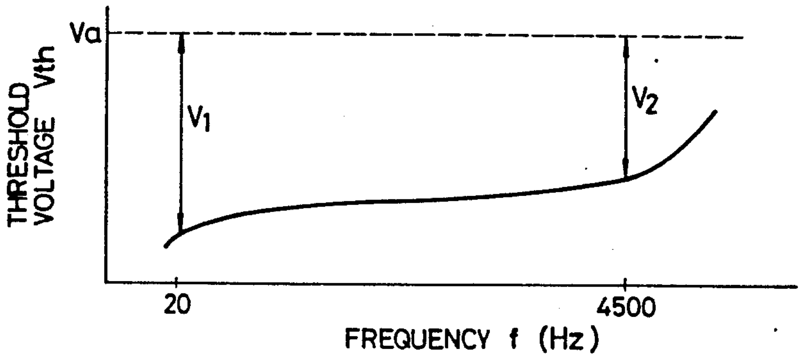
FIG. 1 shows the frequency dependence of the threshold voltage.
Figure 3:
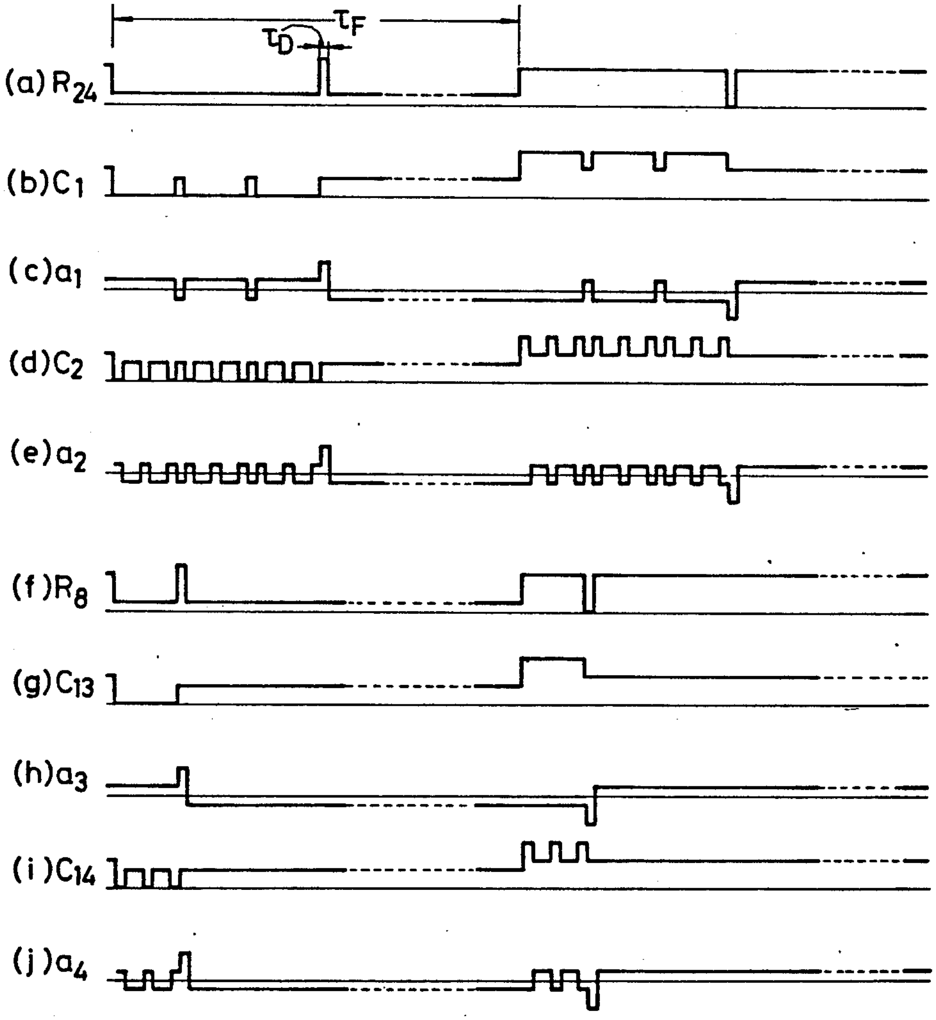
FIGS. 3(*a*) to (*j*) show timing charts of the operations in FIG. 2.

In the driving method B, the frequency $f_D$ of a drive voltage applied to the liquid crystal element is in the range of relation (1) where a frame frequency is $f_F$ and a number of scanning lines, namely a number of multiplexings is n.

$$(\tfrac{1}{2})f_F \leqq f_D \leqq (\tfrac{1}{2})nf_F \quad (1)$$

When considering an example of liquid crystal display device where a number of multiplexings is 100 since the frame frequency $f_F$ is ranged from 40 to 90 Hz, the drive frequency $f_D$ is, in this case, in the range of relation (2).

$$20\ (\text{Hz}) \leqq f_D \leqq 4500\ (\text{Hz}) \quad (2)$$

Figure 11:
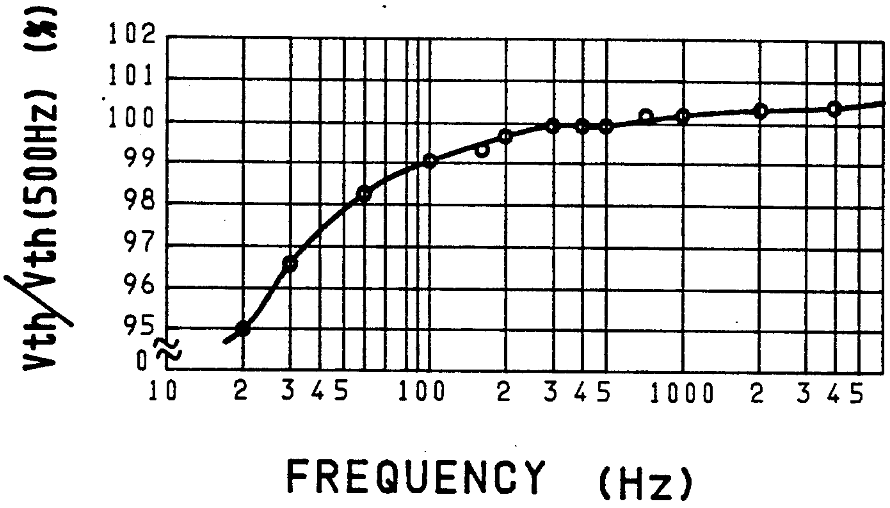
FIG. 11 shows the frequency dependence of the threshold voltages.
Figure 12:
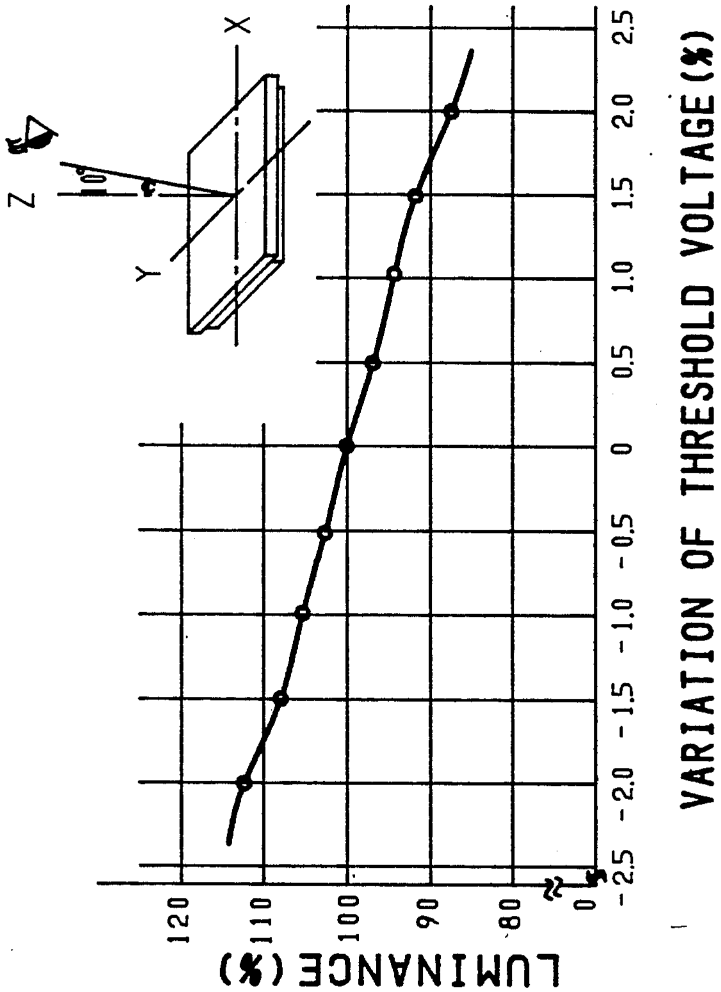
FIG. 12 shows luminance of a liquid crystal device versus variation of the threshold voltages.

FIG. 11 shows change of threshold voltage Vth resulting from change of drive frequency in terms of the percentage for the threshold voltage Vth (500 Hz) with drive frequency of 500 Hz and FIG. 12 shows change of luminance of liquid crystal display resulting from change of threshold voltage Vth.

Therefore, when the drive frequency $f_D$ changes in the range (2), the threshold voltage $V_{th}$ is lowered by 5% in the low frequency side as is apparent from FIG. 11 and thereby the luminance of liquid crystal display is changed by 10% or more with reference to FIG. 12, allowing generation of blur in display. It can also be understood that change of threshold voltage Vth by must be suppressed to about 1.5% or less in view of keeping change of luminance at 10% or less so that blur in display cannot be detected, but the minimum value of drive frequency must be kept at 100 Hz or more in order to suppress change of threshold voltage Vth to 1% or less considering some margin.

Figure 13:
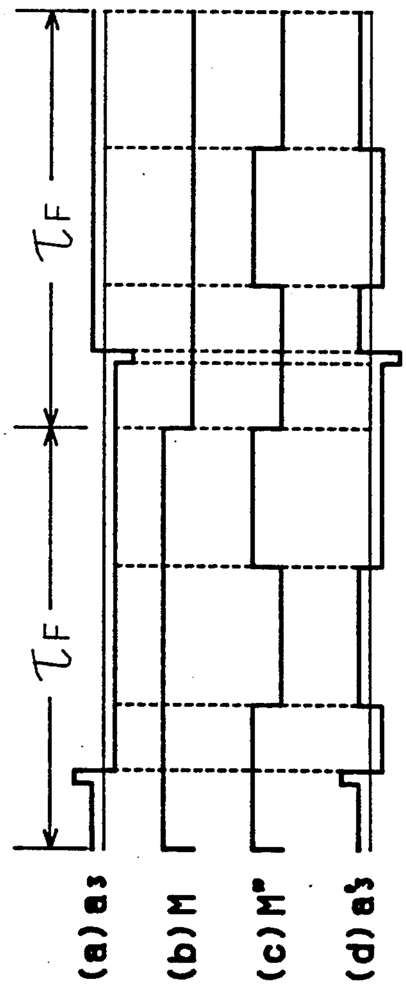
FIGS. 13(*a*) to (*d*) show the timing charts of the operation by reversing the polarity of voltage applied to liquid crystal display elements with frequency higher than the frame frequency.

In order to raise the minimum value of drive voltage frequency component without changing the voltage waveforms applied to the signal electrodes Ci and scanning electrodes Ri from that of the driving method B, the period for reversal of polarity of voltage applied to the liquid crystal element must be set larger than that of the driving method A but must be smaller than that of the driving method B. An example of drive signal waveform applied to the picture element $a_3$ shown in FIG. 2 will be explained hereinafter. In FIG. 13, the waveform (a) is a drive waveform applied to the picture element a during the drive by the driving method B, the waveform (b) is a control signal M for reversing the polarity of voltage applied to liquid crystal layer during the driving method B, namely during the two frame period, the waveform (c) is a new control signal M'' for enhancing frequency component of drive waveform applied to the liquid crystal layer, and the waveform (d) is a drive waveform formed through reversal of polarity by the new control signal M". Since the frequency of new control signal M" is equal to that of tripled control signal M for the driving method B, the frequency component of drive waveform applied to the picture element $a_3$ is also tripled.

The minimum frequency component 20 Hz of the drive voltage in the driving method B can be set higher than the minimum driving frequency 100 Hz for suppressing change of Vth to 1% or less by inversing polarity with the control signal having the period less than 1/5 of that of the control signal M in the driving method B. Meanwhile, if the period of control signal is set excessively short, the driving method becomes similar to the method A and influence of distortion of drive waveform for the effective value of drive voltage becomes large and blur in display is generated.

According to the result of experiment, it is proved that when the frame frequency is in the range of 40~90 Hz and a number of multiplexings n is in the range of 32~200, it is enough to determine the new control signal M" which satisfies the relation indicted below.

$$2.0 \leq (\text{Frame period}/\text{Period of new control signal}) \leq 6.0 \quad (3)$$

The embodiment of the present invention will then be explained in detail with reference to the accompanying drawings.

Figure 2:
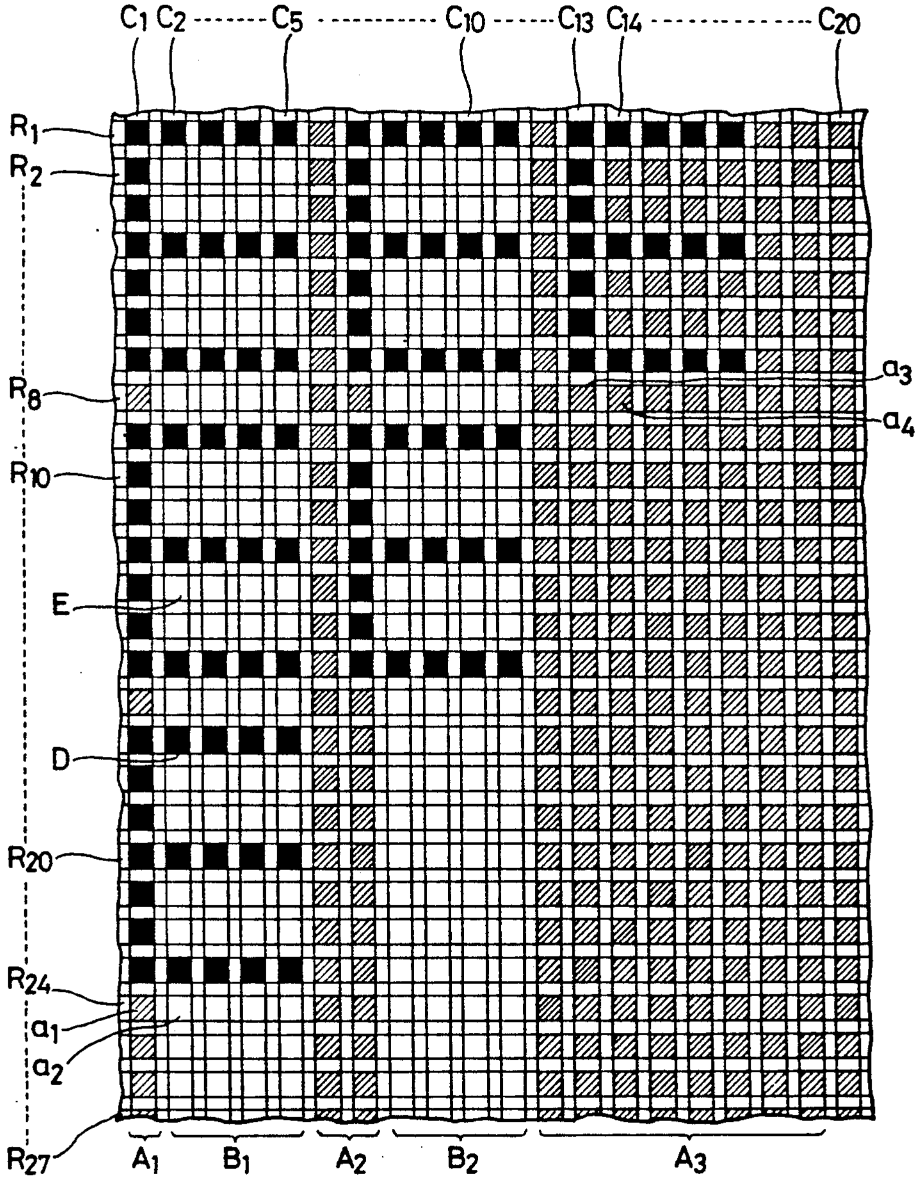
FIG. 2 is a diagram for illustrating the occurrence of blurs in display in the case of displaying the pattern of the alphabet E on the liquid crystal panel.
Figure 4:
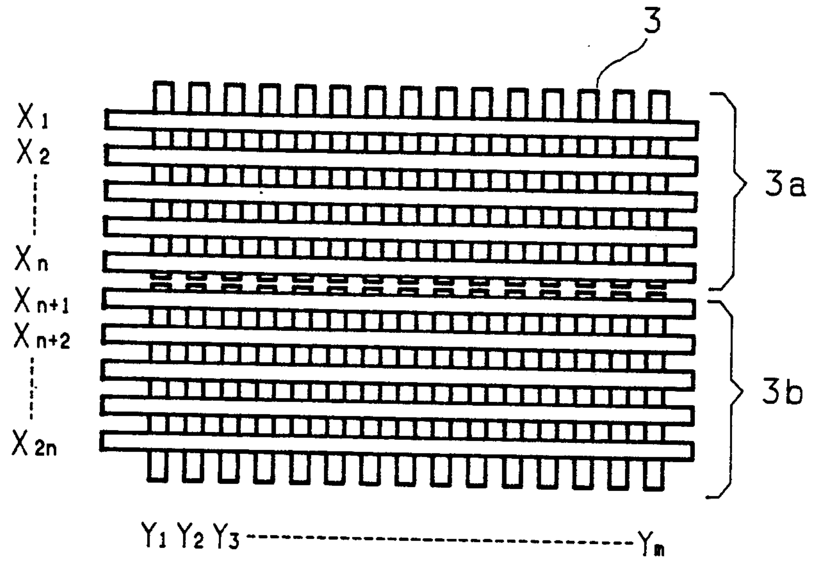
FIG. 4 shows a liquid crystal display panel divided into two parts.
Figure 5:
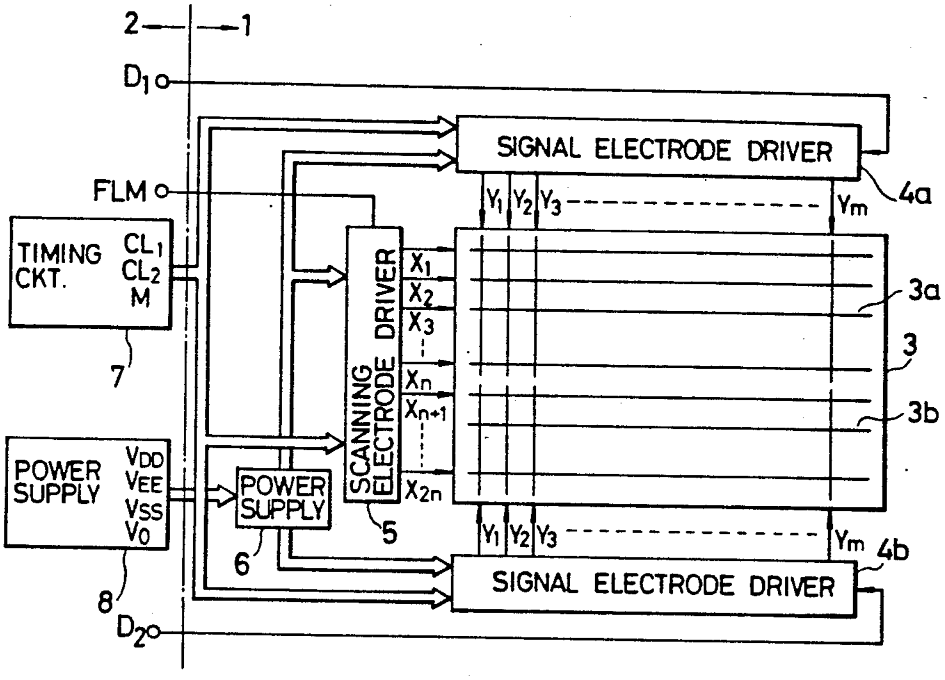
FIG. 5 is a block diagram of one example of a liquid crystal display device to which the present invention is applied.
Figure 6:
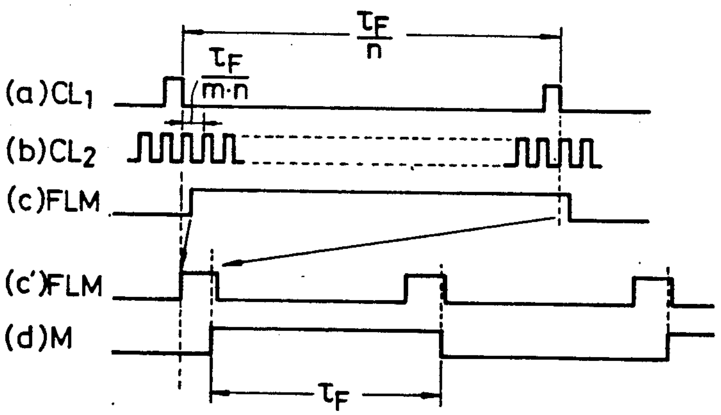
FIGS. 6(*a*) to (*d*) show timing charts of the operations in FIG. 5.
Figure 7A:
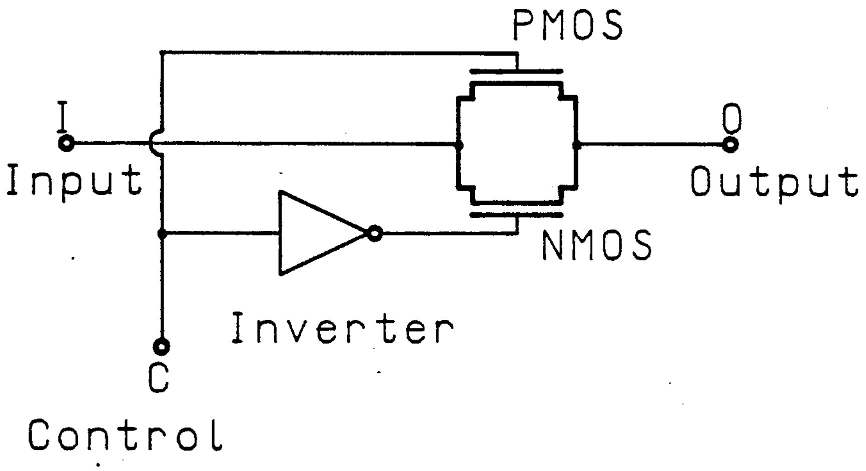
FIGS. 7(*a*) to (*b*) show an MOS transfer gate and its abbreviated symbol.
Figure 7B:
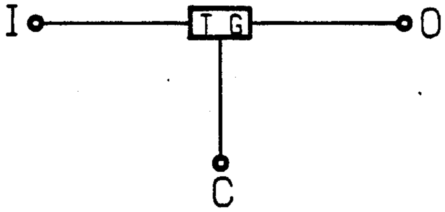
Figure 8:
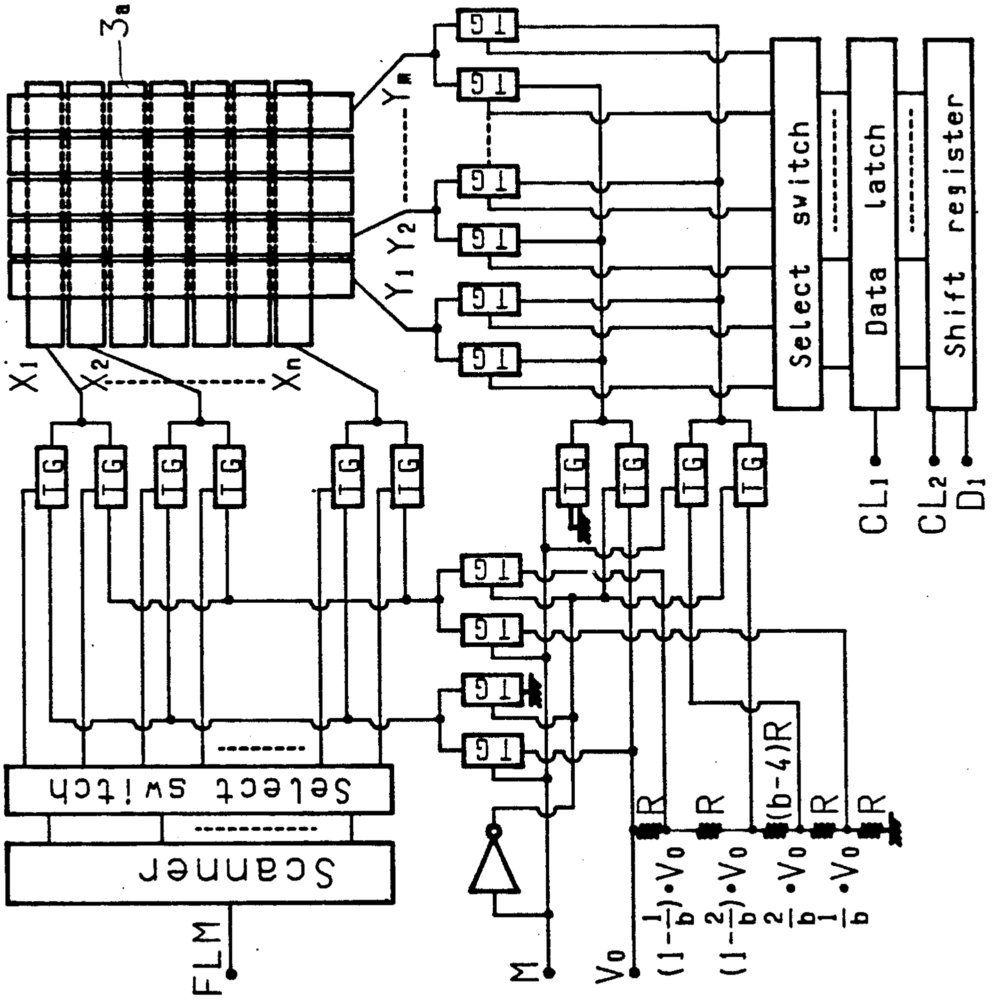
FIG. 8 shows a basic circuit arrangement of matrix liquid crystal display driver.
Figure 9:
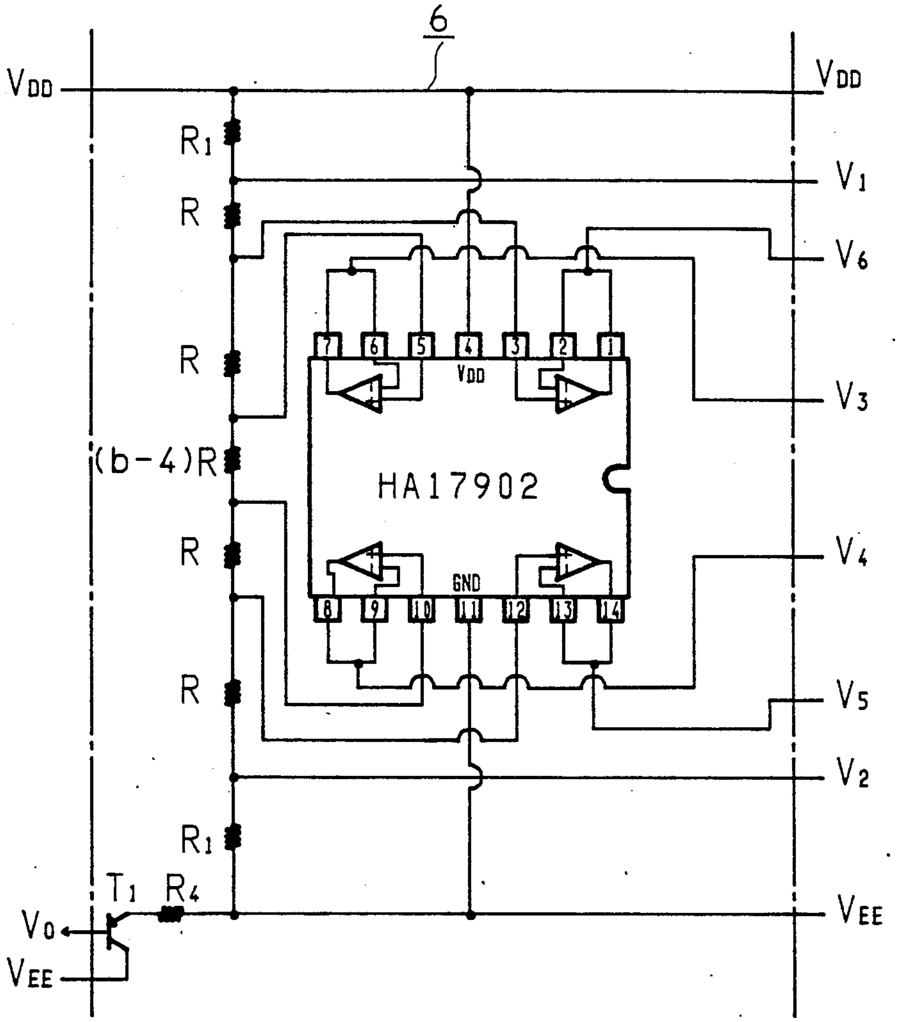
FIG. 9 shows a power supply for the signal electrode driving circuits and scanning electrode driving circuits.

In the driving method B, the control signal M is obtained through reversal of polarity of the liquid crystal drive signal waveform within the two frames as explained above and the new control signal M" is obtained through reserval of polarity within the two frames with the control signal M having the period two times of the frame period $\tau_F$. In case all dots are excited or not excited with such driving method, the frequency of driving waveform applied to the liquid crystal element becomes equal to the half of the frame frequency $f_F = 1/\tau_F$. As explained above, the minimum frequency in the driving method B is lowered and thereby blur is displayed as shown in FIG. 2.

Therefore, the present invention drives the liquid crystal element through reversal of polarity of liquid crystal drive waveform using the new control signal M" having a shorter period than the control signal M which has been used for driving the element in the driving method B.

Figure 14:
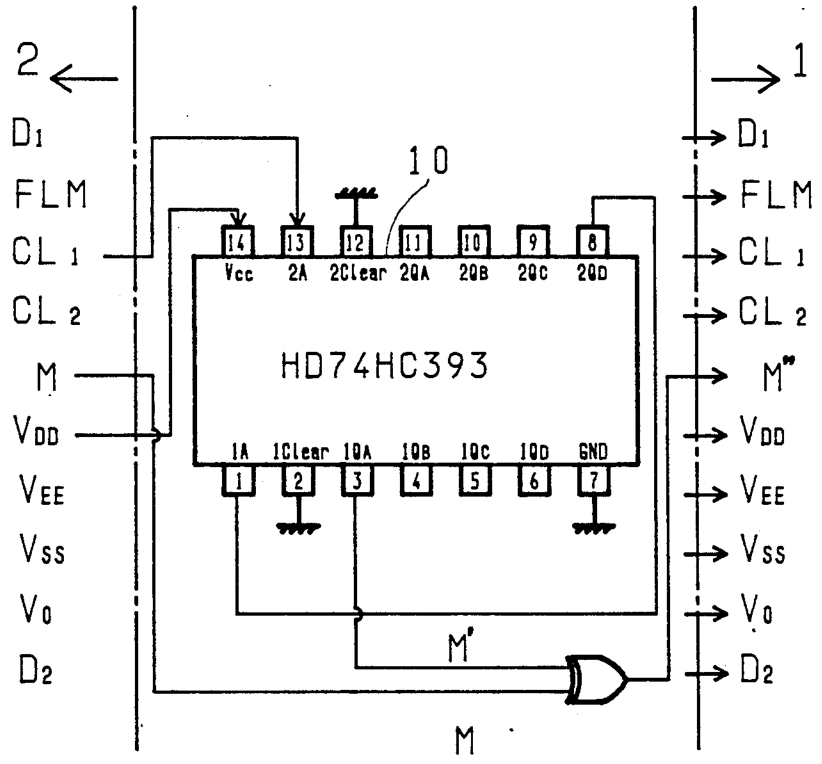
FIG. 14 shows a circuit diagram showing an embodiment of the present invention.
Figure 15:
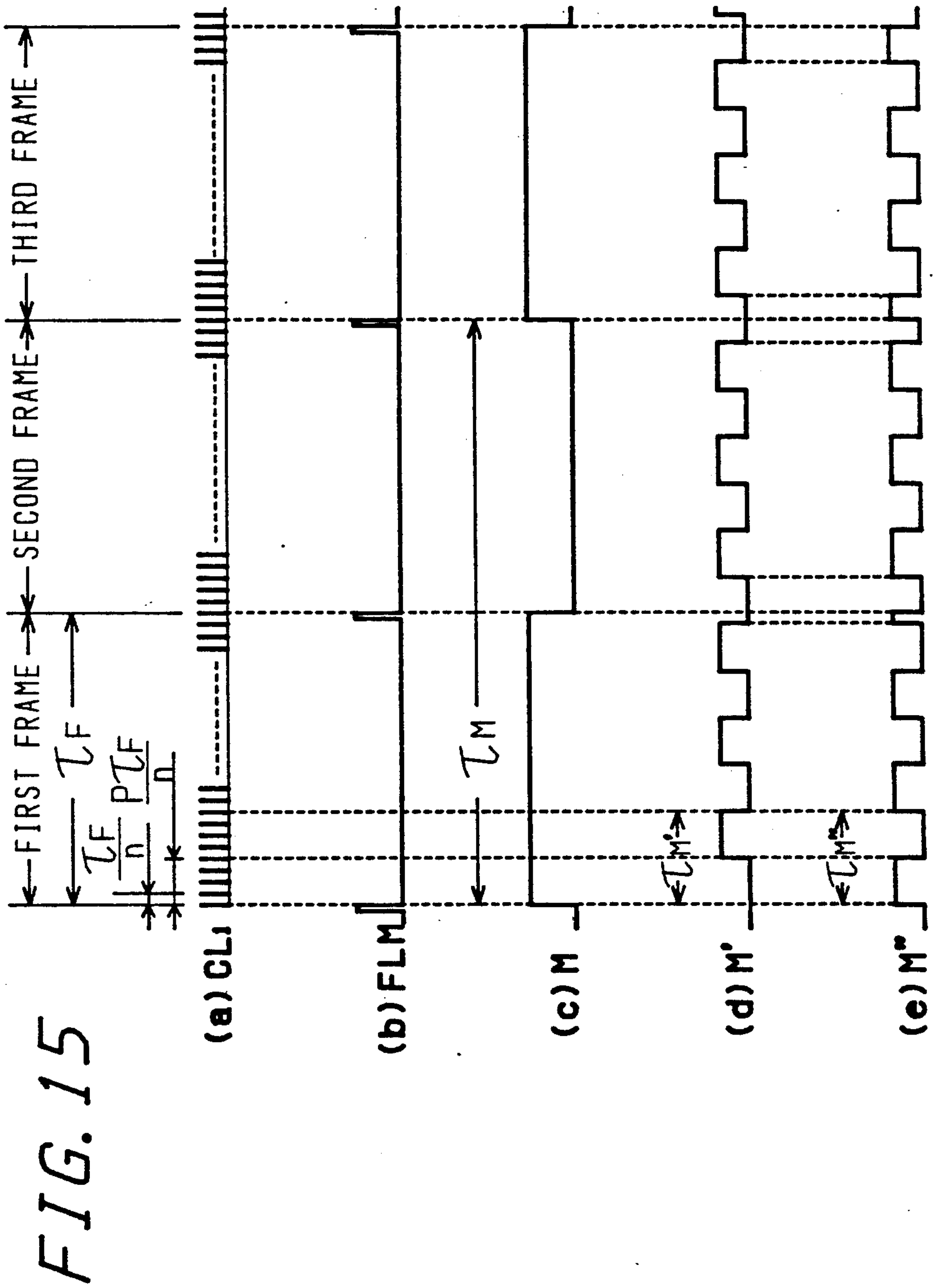
FIGS. 15(*a*) to (*e*) and 16 show the timing charts of the operation in FIG. 14.
Figure 17:
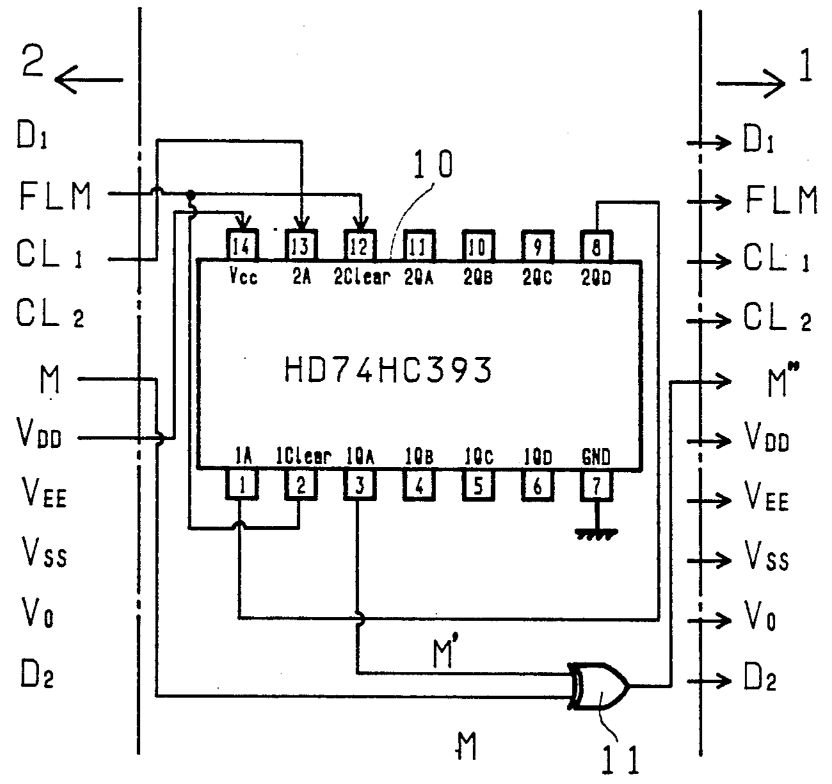
FIG. 17 shows a circuit diagram showing another embodiment of the present invention.

The first and second embodiments of the present invention are shown in FIGS. 14 and 17, respectively. According to the present invention, there are provided a counter 10 (for exmaple, Duel 4-bit Binary Counter HD74HC393 available from Hitachi, Ltd.) which counts the latch signals $CL_1$ and generates the new control signal M' for AC driving as the output, and an exclusive-OR circuit 11 which generates as its output further new control signal M" which corresponds to the control signal M' inverted once per frame period for reversing the polarity of voltages applied to liquid crystal display elements with frequency higher than frame frequency, that is for AC driving, from the above control signal M' and the control signal M originally used for the drivng method B, generated by the control circuit 2 (for example, Liquid Crystal Display Controller Board CB1026R available from Hitachi, Ltd.), between the liquid crystal module 1 and the control circuit 2 as is shown in FIG. 14 and in FIG. 17. Where the new control signal M' to be generated by dividing the frequency of the signal $CL_1$ is obtained by counting the signal $CL_1$ 16 times in these embodiments and the signal M" is obtained as the output of the exclusive-OR circuit which carries out the operation of exclusive-OR between the output M' of the counter 10 and the original M given by the controlling circuit 2. FIGS. 15(*a*) to (*e*) show the timing for each signal $CL_1$, FLM, M, M' and M" in the first embodiment.

In the first embodiment shown in FIG. 14, since the reset signal terminal Clear of the counter circuit 10 is grounded, the counter circuit 10 counts up the latch signal $CL_1$ without relation to the frame signal FLM and outputs the control signal M'. Therefore, the control signal M' and the new control signal M" generated from such control signal M' are not synchronized with the frame signal FLM. The waveforms (a) to (e) in FIG. 15 shows the timings of signals $CL_1$, FLM, M, M', M" used in this embodiment. Since the new control signal M" is not synchronized with the frame signal FLM, the scanning line from which polarity inversion of voltage applied to the liquid crystal starts is shifted for each frame.

Therefore, the polarity inversion starting point of the drive waveform is not fixed to the particular scanning line in the block of liquid crystal display panel and blurs in display can be improved by setting a counted value so that the new control signal M' does not become the integer times of frequency of the control signal M (in the case of driving method B, the signal synchronized with the frequency which is equal to ½ of the frame frequency $1/\tau_F$).

When the control signal M' is generated by counting 16 pulses of latch signal $CL_1$, where a number of multiplexings n is 100 and frame frequency $f_F$ is 80 Hz, the frequency becomes 250 Hz ($f_F \times n/2P = 80 \times 100/2 \times 16 = 250$) and the minimum drive frequency $f_{Dmin}$ becomes 250 Hz.

In the driving method B, where a number of multiplexings in a certain block of liquid crystal panel is n, a counted value of pulse of the latch signal $CL_1$ is P (the frequency of signal $CL_1$ is divided to 1/2P), since the number of pulses of latch signal $CL_1$ within the frame period $\tau_F$ is n, it can be expressed as follow.

$$n = m \times 2P + Q \quad (4)$$

Here, m is a positive integer, $P > |Q|$, $Q \neq 0$.

If shift of scanning lines for polarity inversion can be realized smoothly by setting a count value P of the $CL_1$ as $10 > |Q|$ and more desirably as $5 > |Q|$.

Figure 16:
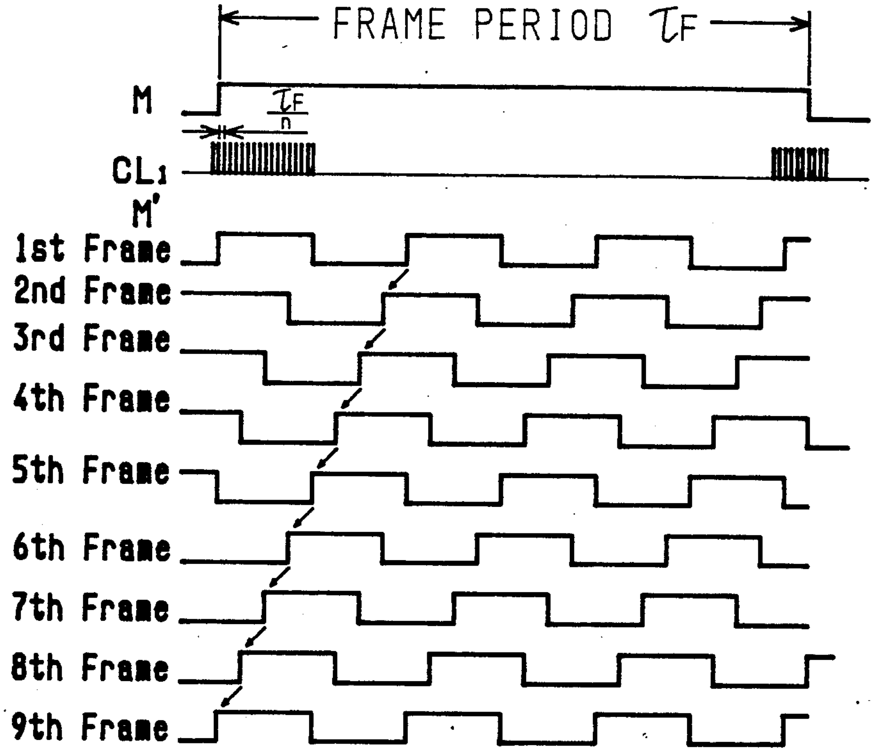

In FIG. 15, since the period $\tau_M$ of the signal M and the period $\tau_{M'}$ of signal M' are set so that $1/\tau_{M'}$ does not become integer times of $1/\tau_M$, the starting point of polarity invsersion of voltage applied to the liquid crystal layer, namely inverting point of the new control signal M' is not fixed to the particular scanning line. In other words, since the scanning line for starting the polarity inversion is shifted and diverged for each frame, blurs in display are no longer generated. FIG. 16 shows shift of inverting point of the control signal M' with the arrow marks.

When 16 in said embodiment is substituted as the counted value P of equation (4), Q becomes equal to 4 and this value indicates that shift of starting point of polarity inversion corresponds to 4 periods of $CL_1$ in each frame and it becomes 10 mSec in the embodiment. By selecting a value of Q in the range from −10 to 10, blurs in display generated during polarity inversion are dispersed to the entire part of display panel and thereby blurs can no longer be detected for practical use and a problem of blurs in display can be eliminated.

In above embodiment, the frame frequency is set to 80 Hz but it is not limited to such value in the present invention and similar effect can be obtained when the frame frequency is set in the range of 40~90 Hz and a number of multiplexings n is set in the range of 416~300.

On the other hand, in the second embodiment shown in FIG. 17, since the frame signal FLM is being input to the reset signal terminal Clear of the counter circuit 10, the counter circuit 10 resets the counter circuit 10 for each input of the frame period signal FLM, starting the counting of the latch signal $CL_1$ and outputs the control signal M'.

Figure 18:
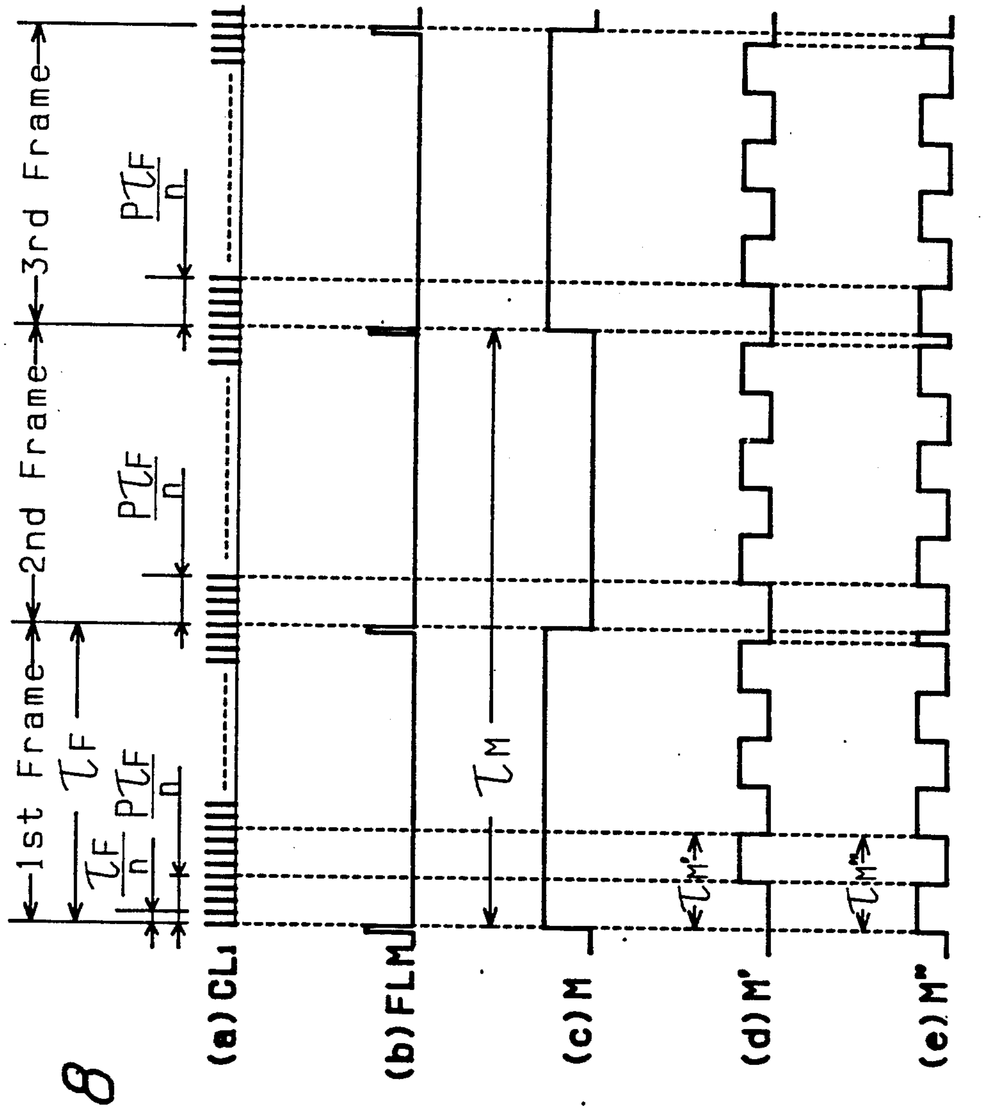
FIGS. 18(*a*) to (*e*) show the timing charts of the operation in FIG. 17.

The control signal M' is synchronized with the frame signal FLM and therefore it is also synchronized with the control signal M" generated from said control signal M'. The waveforms (a)-(e) of FIG. 18 show the timings of respective signals. In this case, since the new control signal M" is synchronized with the frame period signal FLM, the scanning line for starting polarity inversion of voltage applied to the liquid crystal element is not shifted for each frame and is fixed. Where the scanning line from which the polarity inversion of voltage applied to the liquid crystal element starts is fixed for all frames as in the case of the second embodiment, blurs in display may be sometime generated in accordance with the electrode structure or operating conditions of liquid crystal element. In such a case, blurs in display can be eliminated by destroying synchronization of the control signal M" with the frame period signal FLM as shown in the first embodiment.

By the above configuration, the lowest driving frequency can be set to higher frequency than the lowest driving frequency in the conventional driving B method and the blurs in display due to the lowering of the threshold voltage $V_{th}$ of the liquid crystal in the lower frequencies can be reduced.

Figure 10:
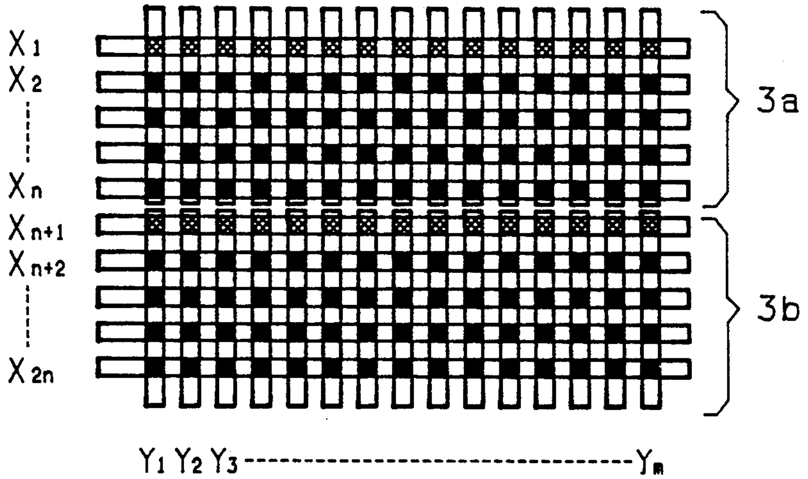
FIG. 10 shows spurious signals due to reversal of the polarity of voltages applied to liquid crystal display elements.
Figure 19:
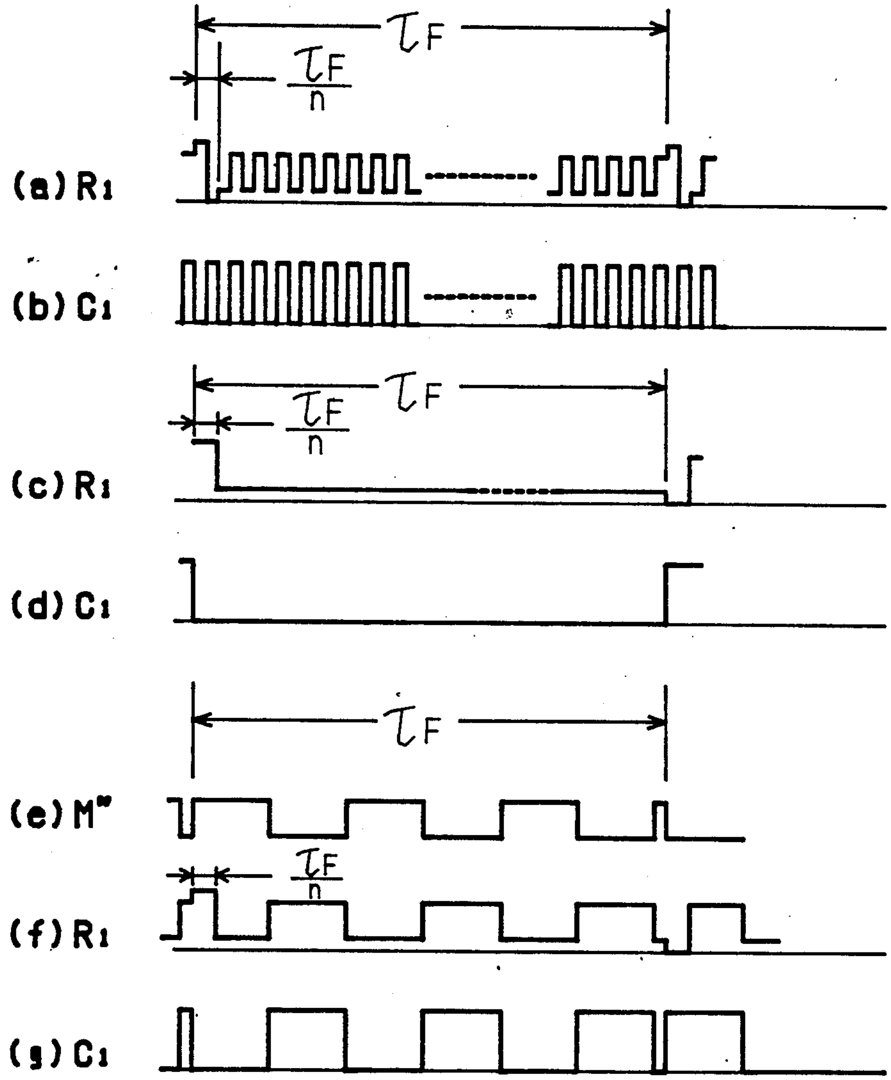
FIGS. 19(*a*) to (*g*) show the timing charts of the operation in FIG. 14 in comparison with the conventional operations.
Figure 20:
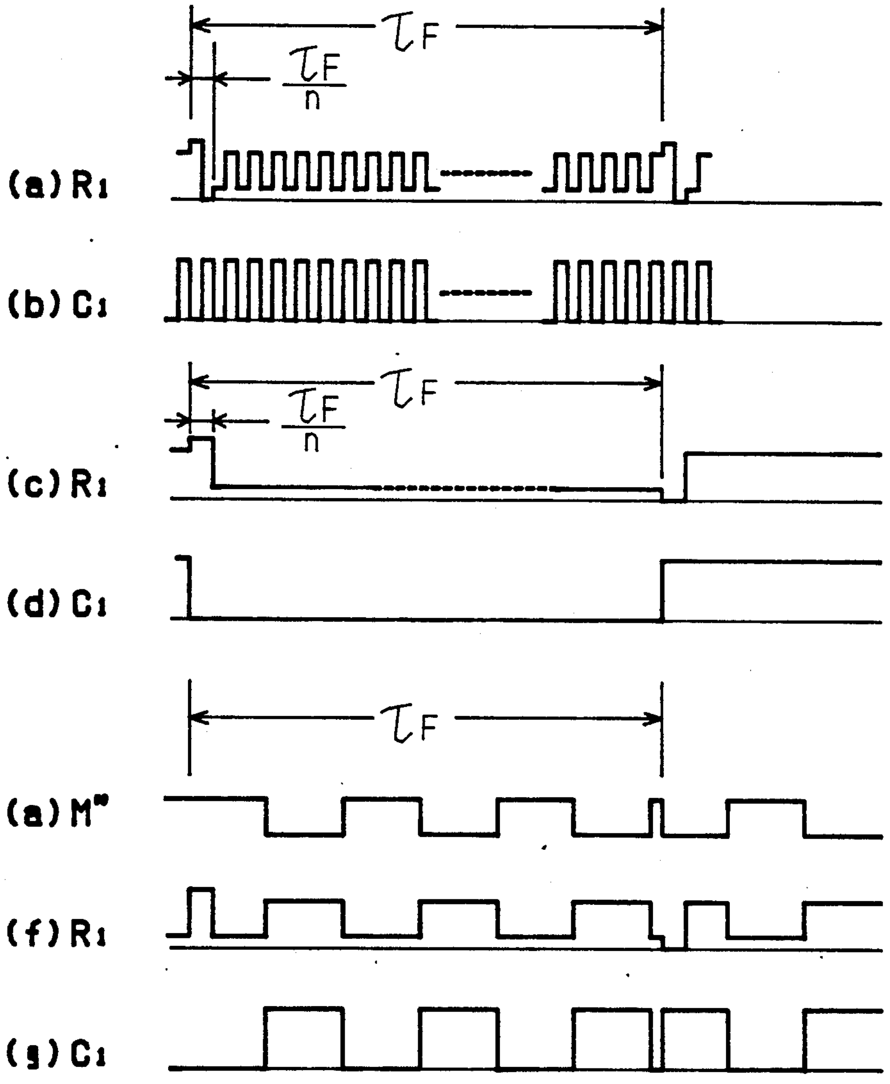
FIGS. 20(*a*) to (*g*) show the timing charts of the operation in FIG. 17 in comparison with the conventional operations.

FIGS. 19(*a*) to (*g*) show the driving waveforms of the scanning electrode driving voltage $R_1$ and signal electrode driving voltage $C_1$ in the case of displaying all elements of the liquid crystal panel shown in FIG. 2 with making comparison among the driving method A, the driving method B and the driving by the first embodiment of the present invention. FIGS. 19(*a*) and (*b*) show the driving wavforms by the driving method A. FIGS. 10(*c*) and (*d*) show the waveforms by the driving method B, and FIGS. 10(*e*), (*f*) and (*g*) show the waveforms in the first embodiment. As is evident from these figures since the driving frequency in the present invention can be set to be lower than that by the driving method A and to be higher than that by the driving method B, it is possible to eliminate the blurs in display. Also, FIGS. 20(*a*) to (*g*) show the driving waveforms of the scanning electrode voltage $R_1$ and the signal electrode driving voltage $C_1$ in the case of displaying all elements of the liquid crystal display panel shown in FIG. 2 with making a comparison among the driving method A, the driving method B and the driving by the second embodiment. FIGS. 20(*a*) and (*b*) show the driving waveforms by the driving method A, FIGS. 20(*c*) and (*d*) show the driving waveforms by the driving method B and FIGS. 20(*e*), (*f*) and (*g*) show the driving waveforms in the second embodiment. As is evident from these figures, since the driving voltage frequency in the present invention can be set to be lower than that by the driving method A and to be higher than that by the driving method B, it is possible to eliminate the blurs in display by this embodiment.

Also, since the driving circuits in the present invention is simple circuits with only two CMOS type integrated circuits added to the conventional driving circuits, there may be no large rise in the cost. And when this driving circuit is considered as a black box from the stand point of usage this circuit is equivalent to the conventional circuits and it has a good compatibility as a system.

In the above mentioned embodiments, the frequency divider of the latch signal $CL_1$ is a binary counter, but it is not limited to a binary counter.

Moreover, in above embodiment, frequency division of latch signal is used for generation of the signal M' but the present invention is also not limited to it and the signal being synchronized with the frame period can also be used.

What is claimed is:

1. A liquid crystal display device comprising:

a liquid crystal module including a liquid crystal display panel having a plurality of liquid crystal picture elements arranged in a matrix form, and driving circuits for applying driving signals to signal electrodes and to scanning electrodes of the liquid crystal display panel, respectively;

a control circuit for controlling the operation of the liquid crystal module;

first means for dividing frequency of a timing signal given by the control circuit and producing a first signal of lower frequency; and second means for inverting the first signal of lower frequency once per frame period and generating a second signal to reverse the polarity of voltages applied to liquid crystal display elements with its period $\tau_{M''}$ satisfying the inequality $$2.0 \leq \tau_F(\text{the frame period})/\tau_{M''} \leq 6.0.$$

2. A liquid crystal display device according to claim 1, wherein $\tau_F$ is not integral multiples of $\tau_{M''}$.

3. A liquid crystal display device according to claim 1, wherein the second signal does not synchronize with the frame frequency.

4. A liquid crystal display device according to claim 3, wherein scanning electrodes where the polarity of voltages applied to the liquid crystal elements reverse differ by less than ten scanning electrodes from frame to frame.

5. A liquid crystal display device according to claim 4, wherein scanning electrodes where the polarity of voltages applied to liquid crystal elements reverse differ by less than five scanning electrodes frame to frame.

6. A liquid crystal display device according to claim 1, wherein the first means is a counter circuit.

7. A liquid crystal display device according to claim 1, wherein the timing signal is a latch signal for latching information data for display.

8. A liquid crystal display device according to claim 1, wherein the second means is an exclusive-OR circuit which is supplied, as its input, with square wave pulses obtained from the first means and with square wave pulses with a period of twice the frame period.

9. A liquid crystal display device comprising:

a liquid crystal module including a liquid crystal display panel divided into a plurality of blocks having a plurality of liquid crystal picture elements arranged in a matrix form, and driving circuits for applying driving signals to signal electrodes and to scanning electrodes of the liquid crystal display panel, respectively;

a control circuit for controlling the operation of the liquid crystal module;

first means for dividing frequency of a timing signal given by the control circuit and producing a first signal of lower frequency; and second means for inverting the first signal of lower frequency once per frame period and generating a second signal to reverse the polarity of voltages applied to liquid crystal display elements with its period $\tau_{M'}$ satisfying the inequality $$2.0 \leqq \tau_F(\text{the frame period})/\tau_{M'} \leqq 6.0.$$

10. A liquid crystal display device according to claim 9, wherein $\tau_F$ is not integral multiples of $\tau_{M'}$.

11. A liquid crystal display device according to claim 9, wherein the second signal does not synchronize with the frame frequency.

12. A liquid crystal display device according to claim 9, wherein scanning electrodes where the polarity of voltages applied to liquid crystal elements reverse differ by less than ten scanning electrodes from frame to frame.

13. A liquid crystal display device according to claim 9, wherein scanning electrodes where the polarity of voltages applied to liquid crystal elements reverse differ by less than five scanning electrodes frame to frame.

14. A liquid crystal display device according to claim 9, wherein the first means is a counter circuit.

15. A liquid crystal display device according to claim 9, wherein the timing signal is a latch signal for latching information data for display.

16. A liquid crystal display device according to claim 9, wherein the second means is an exclusive-OR circuit which is supplied, as its input, with square wave pulses obtained from the first means and with square wave pulses with a period of twice the frame period.

* * * * *